C. K. PRINCE.
METHOD OF AND APPARATUS FOR MAKING AND HANDLING CASTINGS.
APPLICATION FILED AUG. 9, 1919.

1,347,552.

Patented July 27, 1920.

INVENTOR,
Clarence K. Prince,
BY
Harry W. Bowen
ATTORNEY.

UNITED STATES PATENT OFFICE.

CLARENCE K. PRINCE, OF WESTFIELD, MASSACHUSETTS.

METHOD OF AND APPARATUS FOR MAKING AND HANDLING CASTINGS.

1,347,552.   Specification of Letters Patent.   Patented July 27, 1920.

Application filed August 9, 1919. Serial No. 316,468.

*To all whom it may concern:*

Be it known that I, CLARENCE K. PRINCE, a citizen of the United States of America, residing at Westfield, in the county of Hampden and Commonwealth of Massachusetts, have invented certain new and useful Improvements in Methods of and Apparatus for Making and Handling Castings, of which the following is a specification.

This invention relates to improvements in foundry operations and particularly to a continuous process and apparatus, after forming the mold, for transferring and assembling the molds or flasks and bottom board on and to a gravity runway or platform, weighting and pouring the same on the runway, then dumping or discharging the contents of the flasks, and finally returning the empty flasks and bottom board to their first position where they are again refilled. The runway employed in the present invention is preferably one having rollers on which the bottom board travels with the flasks thereon, from the point where the molds are formed or assembled, until they are returned to the place or point of refilling the flasks. At the present time these operations are generally and separately carried out by manual operations which are not only slow but expensive.

The present invention is designed for uniting or combining into a continuous process or series of steps, the operations of the several devices and mechanisms referred to in my pending application filed April 22, 1919, Serial No. 291,932, for a mold handling machine, and an application filed July 18, 1919, Serial No. 311,783 for a mold assembling crane and an application for a combined mold-pouring and weighting machine filed August 9, 1919, Serial No. 316,467, which specifically show, describe and claim the devices referred to in these applications.

The description and claims in the present case will, therefore, be confined to the process and apparatus, as a whole, for carrying out the above mentioned continuous process or steps relating to the operations of molding, casting and dumping. The drawings which form a part of the present specification, show the general arrangement and location of the various elements for carrying out the continuous molding, casting and dumping operations and in which—

Figure 1:
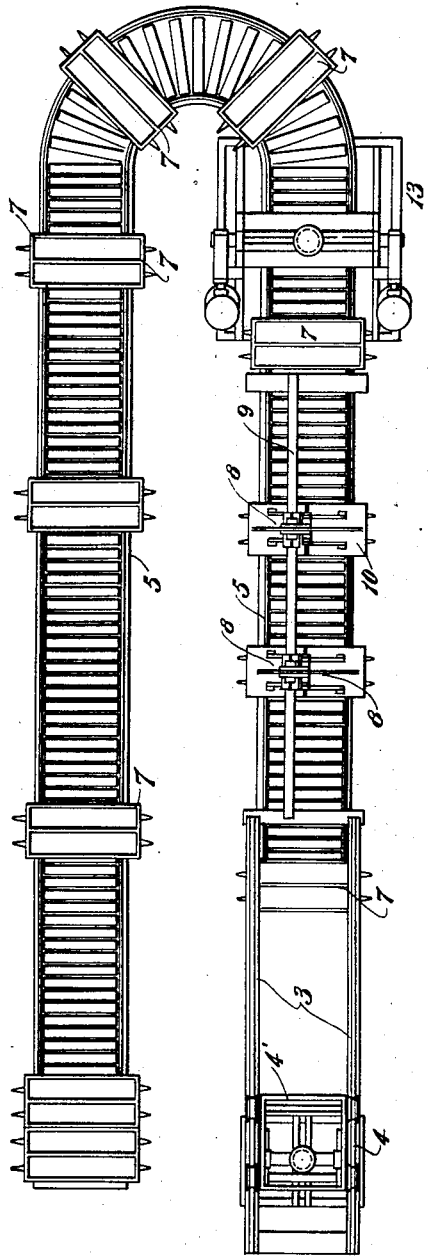
Figure 1 is a plan view of the inclined gravity runway having rollers along which the bottom board travels with the flask thereon and showing the location and arrangement of the various devices used in connection with the runway.
Figure 2:
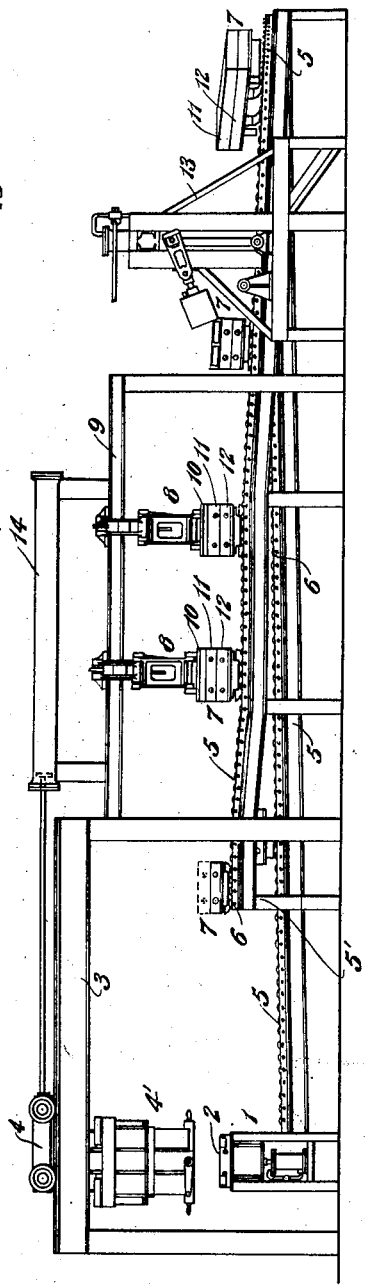
Fig. 2 is a side elevational view of Fig. 1 illustrating the mold forming platform, the mold transferring and assembling device, the flask receiving and assembling platform having rollers for conveying the flasks along the same, the weighting and pouring devices, the mold handling apparatus in a section of the platform and the empty flasks being returned to the molding platform.

Referring to the drawings in detail, 1 designates a suitable stationary platform on which the molding frames 2 are placed and the molds filled or formed, 3 an overhead runway or track on which is movably placed the truck 4 and an apparatus 4' for picking up the filled molds 2 and for transferring or conveying the same onto the platform 5, where the parts, the cope and the nowel, composing the flask are assembled on the bottom board 6 at the horizontal end 5' of the platform. One of the assembled flasks is indicated by the numeral 7. After the flasks are assembled, they are moved along the rollers of the inclined runway 5 to a position where the next operation in the process occurs. This operation occurs at that point or part of the runway where the weighting and pouring apparatus indicated at 8 is used. This apparatus is supported in any suitable manner on the beam 9 and includes a suitable weighting member 10 which engages and rests upon the assembled flask composed of the usual cope and nowel members 11 and 12 as shown in Fig. 2. After the pouring is completed, the weighting member 10 is elevated and the bottom board 6 with the flask thereon is then moved or rolls down the runway 5 to the point where the mold handling apparatus is located, the details of which are shown described and claimed in my pending application above referred to for the mold handling machine, and is designated as a whole, by the numeral 13. This apparatus, which is located in a section of the platform 5, discharges the contents of the flasks by removing or lowering the bottom board away from the flasks when their contents are discharged. It then returns the empty flasks and bottom board to the runway when they are returned to the mold forming point in the operations and ready for reforming the molds again on the platform 1. 14 designates, broadly, any device, as a cylinder, having compressed air, for moving the mold, lifting and transferring apparatus from the platform 1 to the point 5′ which designates the receiving and assembling end of the runway 5.

From this description it will be seen that I have provided and united into a single structure, an apparatus for carrying out all of the foundry steps relating to forming, pouring and emptying the flasks by continuously forming and assembling the flasks, weighting and pouring the same, discharging the contents of the flasks and returning the emptied flasks to the mold forming position.

What I claim is:

1. An apparatus as described, for continuously carrying out the assembling and casting operations which include a device having a horizontal platform for receiving and assembling molds thereon, and including the mold assembling devices for the flask and molds on a single track gravity runway having horizontal and inclined portions for causing the movement of the assembled flask along the same, then weighting and pouring the flask on the horizontal portions, then transferring the poured flask along the runway in a straight line to a point in the track at which point means are employed for automatically discharging the contents of the flasks and finally returning the emptied flasks onto the same single track to the original mold forming position or platform.

2. An apparatus for carrying out the assembling of the molds and the casting and dumping operations and comprising in combination, of a single track gravity runway having horizontal portions included in its length, said runway being provided with rollers, means for transferring and assembling the flasks to and onto the runway, means for weighting and pouring the flasks while on the runway, means for discharging the poured flasks and returning the emptied flasks to the runway, said runway serving to return the emptied flasks to their initial or mold forming position.

3. In an apparatus for carrying out foundry operations, in combination, of a single gravity runway having a straight portion included in its length, rollers thereon to receive the bottom board which supports the flasks and for transferring the board and flask thereon automatically along the runway, means located adjacent the runway to support a flask weighting and pouring apparatus, means located in a section of the runway for automatically discharging the contents of a flask by lowering the bottom board and a section of the runway and for returning the bottom board and section of the runway to its original position under the flask and for returning the emptied flask on the runway to its place of beginning.

4. In an apparatus for carrying out foundry operations, the combination, of a gravity runway, rollers thereon to receive the bottom-boards of the flasks, and for transferring the boards and flasks thereon automatically along the runway, and means located adjacent the runway to support a flask weighting and pouring apparatus.

CLARENCE K. PRINCE.